Inventors:
Robert R. Russell,
Harvey E. Cline,
Warren De Sorbo,
by Jane M. Binkowski
Their Attorney.

United States Patent Office 3,594,292
Patented July 20, 1971

3,594,292
PROCESS FOR PRODUCING ARTICLES WITH APERTURES OR RECESSES OF SMALL CROSS-SECTION AND ARTICLES PRODUCED THEREBY
Robert R. Russell, Burnt Hills, Harvey E. Cline, Latham, and Warren De Sorbo, Ballston Lake, N.Y., assignors to General Electric Company
Filed Dec. 30, 1968, Ser. No. 787,802
Int. Cl. B23p 1/00; B29c 17/08; B22d 7/10
U.S. Cl. 204—143
15 Claims

ABSTRACT OF THE DISCLOSURE

A process for preparing a body with substantially parallel apertures of small cross-section useful as a filter. An alloy is cast which is in the solid state is comprised of at least two phases. The cast alloy is directionally solidified to produce a body wherein one of the phases is present as a plurality of substantially parallel rods passing through a matrix comprised of the second or other phases. The directionally solidified body is etched to remove the rodlike phase to form straight-through apertures or, if desired, recesses.

---

The present invention relates generally to the art of producing articles having straight-through substantially parallel openings or apertures of uniquely small transverse-sectional dimension.

It has long been recognized that a thin sheet-like body having straight-through openings of extremely small size would have a number of potentially important uses.

In the past, metal filters have been made by weaving wires to form fine screens but the resulting holes are coarse. In another method, a fine metal powder is mixed with another powder which may be metal, and the mixture is sintered to form a dense mass which is then etched to remove one of the powders. The resulting product has pores that are not regular in size or shape. Porous bodies such as expanded Vycor tubing and certain filter papers have openings or apertures of minimum cross-sectional dimension, but their utility has been quite limited because they cannot be produced with straight-through apertures. In addition, they cannot be used for a number of applications where high tensile strength, or electrical or metallic properties are desired. Although, filters having straight-through holes of small cross-section have been prepared by irradiating a sheet of plastic and etching away the radiation tracks, this method cannot be used on metals.

By virtue of the present invention, openings or apertures can be formed in sheets of a directionally solidified alloy to produce articles for uses not met by prior art porous bodies. Further, in accordance with this invention, substantially cylindrical and parallel apertures or recesses of substantially uniform size can be produced. In addition, by partially or completely filling these apertures or recesses as the case may be, with selected materials, composite bodies for a wide variety of special purposes and uses can be made.

Those skilled in the art will gain a further and better understanding of the present invention from the detailed description set forth below, considered in conjunction with the figures accompanying and forming a part of the specification, in which.

Figure 1:
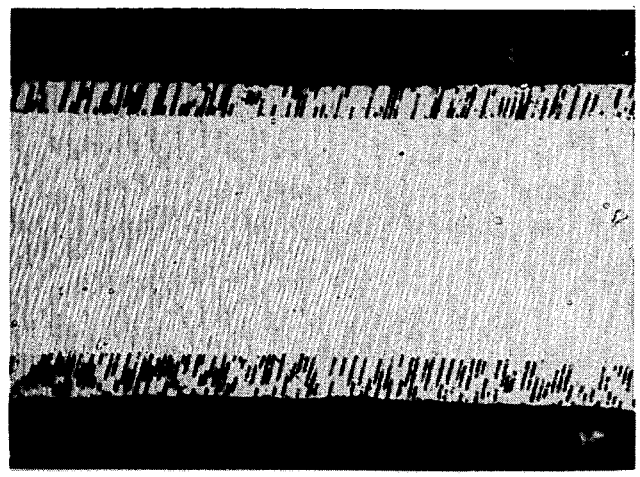
FIG. 1 is a longitudinal section magnified one thousand times of a foil after 7 minutes of etching, showing partial removal of the chromium-rich rods. The foil was prepared from a transverse slice of a directionally-solidified nickel aluminum-chromium ingot as disclosed in Example 2.

Described broadly and generally, an article of this invention is a solid body which has a plurality of recesses or apertures of minimum transverse-sectional dimensions. These recesses and apertures are aligned, that is, disposed with their longitudinal axes substantially parallel to each other, and in all instances, the recesses and apertures are straight bores as distinguished from the tortuous passageways characteristic of the expanded Vycor and filter paper articles of the prior art.

As used herein, by the terms "pore," "aperture" or "hole" is meant a hole extending in a substantially straight line from one surface of the etched sample through the opposite surface. On the other hand, by the term "recess" is meant a hole extending in a substantially straight line from one surface of the etched sample and ending within the etched sample. In addition, the word "phase" defines a quantity of matter having substantially the same properties such as crystal structure and composition. By the term "directional solidification" is meant the solidification of the alloy in a single direction.

Briefly stated, the process of the present invention comprises casting an alloy which in the solid state is comprised of at least two phases. The cast alloy is directionally solidified to produce a structure wherein one of the phases is present as a plurality of substantially parallel rods extending through the second phase which serves as a matrix. The directionally solidified structure is etched to selectively remove the rodlike phase to form straight-through apertures, or if desired, recesses.

The alloy of the present invention is a eutectic alloy which is comprised of at least two phases in the solid state. It need only be of a composition which upon being cast and directionally solidified will produce the rodlike phase. Such a composition is the eutectic composition or a composition close thereto. The range that the composition may vary from the eutectic is determinable empirically for the specific alloy. For a majority of these alloys, such range is generally up to about 10 percent by weight from the eutectic.

There are a number of eutectic alloys which upon being directionally solidified have one phase present in a rodlike form as required by the present invention. Representative of these alloys are NiAl-Cr, Ni-W, NiAl-Mo, Al-Al$_3$Ni, Ta-Ta$_2$C, CoAl-Co, Cb-Cb$_2$C, Cb-Th, Ni-Ni$_{17}$Th$_2$, Ni-Ni$_3$P, Co-Co$_{17}$Y$_2$, Fe-FeSb, Cr-C, Ti-B, Ti-Th, V-V$_3$Si, Ni-Ni$_3$B, InSb-Sb, and Cu-Cr. Typical of alloys having non-metallic characteristics which are also useful in the present invention are NaF-LiF, LiF-NaCl, NaF-NaCl and NaF-NaBr.

Generally, in carrying out the instant process, the alloy components are melted together to obtain as uniform a molten mass as possible. The molten mass is then cast by a conventional method to the desired size.

The cast alloy can be directionally solidified by a number of conventional methods which allow passage of the solid-liquid interface in one direction, i.e. cooling of the sample from one end to the other. Generally, the apparatus is comprised of a heated vertical mold provided with a cooling system at its lower end, usually water, and means for controlling the rate of solidification, generally by moving the ingot-containing mold at a constant rate away from the heat source used to melt the ingot.

The rod-like phase produced in the directionally solidified alloy depends upon the specific composition of the alloy and the rate at which it is solidified. The rate of solidification may vary widely. The specific rate of solidification is determinable empirically and depends largely on the particular composition of the alloy and size of the rods to be produced. Satisfactory directional solidification of a number of alloys can be carried out at a rate in the range of about $1 \times 10^{-5}$ centimeter per second to about 0.1 centimeter per second. The faster the rate of solidification, the finer and closer are the rods. Conversely, with a decreasing rate of solidification, fewer rods will be formed but these rods will have, substantially, a correspondingly larger diameter. Too high a rate of solidification for a particular alloy composition may result in non-uniform rods. For most applications, the rods may have a thickness ranging from about 1000 angstroms in diameter to about 10 microns in diameter. Correspondingly, the density of the rods may range from about $10^9$ per square centimeter to about $10^5$ per square centimeter.

Generally, prior to etching, the directionally-solidified ingot is cut in a direction transverse to the rod phase to a size desired for etching. Any conventional means such as a moving saw, cut-off wheel, or spark cutting can be used. The slices may be of any desired thickness depending largely on the strength of the alloy and alloy ductility in relation to the thickness desired in the final product. The slice of alloy can be etched directly, or preferably, it is polished prior to etching to remove the distorted surface layer generated during mechanical slicing. Such polishing is also useful to reduce the slice to the desired thickness, such as, for example, a foil.

The particular etchant used depends largely upon the specific composition of the rodlike phase to be removed as well as the matrix through which it passes. Such compositions are known from phase diagrams in the literature. If the phase diagram is not available, the compositions are easily determinable by standard metallographic procedure and X-ray analysis. The etchant used should selectively etch the rodlike phase and should not significantly affect the remainder of the specimen.

The etching can be carried out in a number of conventional ways. For example, the alloy specimen can be immersed in a solution of the etchant until the rods are etched away to form holes. However, if recesses rather than holes are desired, only one surface of the specimen should be contacted with the etchant until the rods are etched to form recesses of the desired depth. In some instances, especially when the specimen is as thin as a foil, electrolytic etching is preferred because it can be carried out at a fast but easily controlled rate. Upon completion of the etching, the specimen is preferably rinsed with water or neutralizer to stop further etching action.

In the present invention, the specific thickness of the etched specimen can vary widely and depends somewhat on its final use. Its minimum and maximum thickness is limited by the etchability of the phase which serves as matrix as well as the rod phase to be removed. It need only be thick enough to form a continuous film. The holes or recesses formed by removing the rods are of substantially uniform size. Their cross-sectional area depends on the thickness of the rods. For most applications, a suitable diameter of the holes or recesses formed by removing the rodlike phase will fall within the range of about 1000 angstroms to about 10 microns.

All proportions and amounts stated herein are on the weight basis unless otherwise noted.

The invention is further illustrated by the following examples.

In the following examples, a conventional apparatus was used to directionally solidify the alloy. It included an induction furnace for melting the alloy and a water-cooled base for solidification.

EXAMPLE 1

An eutectic alloy composed of 40% by weight nickel, 20% by weight aluminum and 40% by weight chromium was prepared by melting the components, each of which was about 99.9% pure, under argon in an alumina crucible. The molten alloy was cast under argon in a copper mold to produce a cylindrical ingot 2.2 cm. in diameter and 15 cm. long. The ingot was placed in an alumina crucible and was directionally solidified at a rate of $4 \times 10^{-4}$ cm. per second (0.6 inch per hour) in argon.

Metallographic examination of both ends and along the length of the ingot showed the rod-like phase to be substantially perpendicular to the planes of both ends of the ingot. The ingot was sliced transversely to the rod growth direction by a cut-off machine. Each slice was about 10 mils thick. The distorted surface layers generated during slicing were ground manually with abrasive papers and then polished with aluminum oxide abrasives using grades down to 0.3 micron. Each slice was then placed on a vibrating lapping machine where it was polished with a 0.05 micron aluminum oxide abrasive until its surfaces were substantially completely free of distortion. Each slice was reduced to a tapered foil having a thickness ranging from 50 microns (0.002 inch) to a little less than about 25 microns (0.001 inch). Light microscopy of the polished surfaces revealed uniformly distributed cross sections of chromium rich rods in a nickel-aluminum rich matrix.

One of the foil samples was made the anode in a conventional electrolyte cell having an electrolyte of 3% oxalic acid in water. Stainless steel was used as the cathode. A potential of 3 v.-DC was applied to the cell for one minute. The etched foil was then rinsed with water and examined. Electorn micrographs of a platinum shadow cast carbon replica of the etched sample were made. The projections shown on the replica indicated that the chromium rods were etched away leaving substantially cylindrical recesses approximately 1 micron deep with about 90% being about 0.5 micron in diameter and the remainder being a little less than about 0.5 micron in diameter. The recesses of the etched foil had a density of $7 \times 10^7$ per square cm. as determined by counting the recesses from a micrograph and, knowing the magnification of the micrograph, calculating the number of recesses per square centimeter.

EXAMPLE 2

Figure 2:
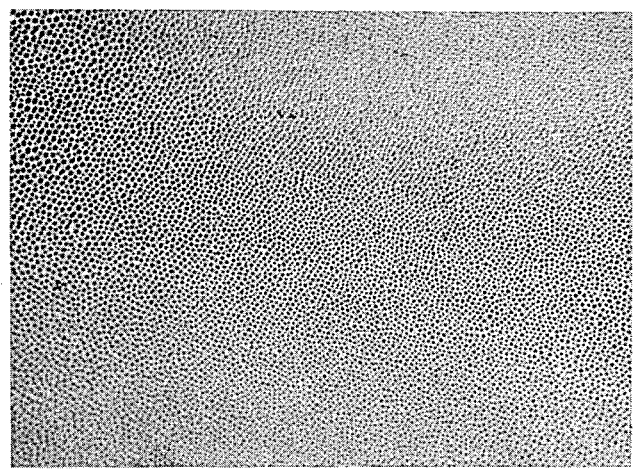
FIG. 2 is a plan view magnified one thousand times of the surface of the foil of FIG. 1 upon completion of the etching, showing the holes etched by removal of the chromium-rich rods.

One of the foils prepared in Example 1 was used in this example. It was made the anode in a conventional electrolytic cell using stainless steel as the cathode. The electrolyte was composed of 3% oxalic acid in water and contained one drop of a wetting agent (sold under the trademark Aquet by Manostat Corp., New York, N.Y.) per 100 ml. of the electrolyte. A potential of 3 v.-DC was applied to the cell. The rate of etching of the rods was periodically checked by taking transverse sections of the foil and examining them metallographically. After 7 minutes of etching, examination of a longitudinal section of the foil showed a partial removal of the chromium rich rods as shown in FIG. 1. After ½ hour of etching, the foil was removed from the cell, rinsed with water and examined. The chromium-rich rods had been entirely removed from the foil and a micrograph of the foil is shown in FIG. 2.

The etched foil was strong and flexible. It had a thickness of 25 microns. Metallographic examination of the etched foil showed that the holes passed completely through the foil and were substantially evenly spaced and uniform in size and diameter through the thickness of the foil. Specifically, about 90% of the holes were about 0.6 micron in diameter, and the remainder were slightly less than about 0.6 micron in diameter. The nickel-aluminum matrix of the etched foil was not noticeably attacked by the etchant.

EXAMPLE 3

In this example, the membrane characteristics of the etched foil produced in Example 2 were determined.

The etched foil produced in Example 2 which was approximately 20 microns thick was mounted and epoxied in place between two Lucite plastic washers and allowed to air dry. This structure was mounted so that the etched foil covered an opening at one end of a chamber made of Lucite plastic. Through a second opening, water was added to the chamber and pressure could be applied to the water contained in the chamber. A pipette was mounted outside the chamber but adjacent to the foil to receive all water passed through the etched foil, i.e. the membrane.

Pressures up to about 0.12 atmospheres (50 p.s.i.) were applied to the water contained in the cell. The procedure was repeated using, instead of water, a 50—50 volume percent methanol-water solution as well as a 50—50 volume percent ethanol-water solution. The pores in the etched foil were determined to have a flow permeability directly proportional to the applied pressure and inversely proportional to the solution viscosity as predicted by viscous flow theory, i.e. Poisseuille's Law, $$\text{Flow} = \frac{NA\pi r^4 (\Delta p)}{8\eta \Delta}$$

For example, a pressure of 0.10 atm or 40 p.s.i. on the water contained in the cell resulted in a flow permeability of $$0.21 \frac{cc}{cm^2 \, sec \, atm}$$

whereas the same pressure applied to a 50—50 volume percent methanol-water solution resulted in a flow permeability of $$0.12 \frac{cc}{cm^2 \, sec \, atm}$$

and when applied to a 50—50 volume percent ethanol-water solution, the flow permeability was 0.082

$$0.082 \frac{cc}{cm^2 \, sec \, atm}$$

The membrane was strong and flexible.

The procedure was repeated, applying pressures of up to about 30 atmospheres on water contained in the chamber without any deteriorating effect on the metal membrane, i.e. the metal membrane held mechanically.

EXAMPLE 4

In this example, the salt rejection characteristics in aqueous solutions of the membrane of Example 3 were determined and compared to a cellulose acetate membrane.

The apparatus used in Example 3 was also used in this example except that a capillary tube with a 0.010″ bore was substituted for the pipette and two parallel electrodes were mounted about 8 inches apart, on the capillary tube with one end of each electrode passing transversely through one wall of the tube and ending at the opposite wall. The electrodes were silver-silver chloride.

In this example, the salt rejection characteristics in aqueous solutions of the membrane of Example 3 were determined and compared to cellulose acetate. This method depends on the change in conductivity of the solution after it is forced through the membrane. Specifically, the conductivity in the capillary tube carrying the effluent liquid is compared with that, previously obtained, of solutions of known concentrations of the salt in the capillary. That is, salt rejection, based on total chloride, is $$R = \frac{C_i - C_f}{C_i}$$

where R=rejection rate $C_i$=concentration (mole/liter) of feed solution
$C_f$=concentration (mole/liter) solution effluent from the membrane For comparative purposes, the cellulose acetate membrane was substituted for the etched metal membrane and the runs were repeated under the same conditions. The cellulose acetate membrane was a "Loeb" type membrane 3.5 mils thick. The rejection tests were carried out on both the etched NiAl-Cr and cellulose acetate membranes at the relatively low pressure $\Delta p$ of 2.0 atmospheres, i.e. pressure above atmospheric, using dry pure nitrogen gas and a stirring rate of 500 rpm. The rejection rate results on both types of membranes are given in the following table.

| Solution | Rejection rate NiAl-(Cr) membrane, percent | Rejection rate Cellulose acetate membrane, percent |
|---|---|---|
| 0.01 M NaCl | 11 | 11 |
| 0.01 M NaCl (plus $10^{-4}$ M ZrOCl$_2$) | 32 | |
| 0.01 M NaCl (plus 250 p.p.m. alkyl dimethyl benzylammonium chloride) | | 33 |
| 0.01 M CaCl$_2$ | 15 | 54 |
| 0.01 M CaCl$_2$ (plus $10^{-4}$ M ZrOCl$_2$) | 54 | |
| 0.01 M MgCl$_2$ | 29.5 | 55 |
| 0.01 M MgCl$_2$ (plus $10^{-4}$ M ZrOCl$_2$) | 55 | |
| 0.01 M AlCl$_3$ | 57 | 76 |
| 0.01 M AlCl$_3$ (plus $10^{-4}$ M ZrOCl$_2$) | 58.5 | |

As illustrated by the above table, the addition of small amounts of an hydrolyzable salt, such as ZrOCl$_2$, can improve rejection rates, making them comparable to those observed in cellulose acetate.

When comparing permeabilities of the NiAl-Cr and cellulose acetate membranes, it was found that the permeability of the metal membrane was greater by at least a factor of three. Permeability of cellulose acetate was found to be less than 2.0 gal./ft.$^2$ day atm. whereas for the etched NiAl-Cr membrane, the value was greater than 6 gal./ft.$^2$ day atm. These values were both evaluated at $\Delta p=2$ atmospheres. Since the metal membrane is strong and flexible, transmission rates of several hundred gallons should be easily attainable at higher pressures.

EXAMPLE 5

In this example, it is shown that the metal membranes of Example 3 can remove iron and iron coloration from aqueous iron chloride solutions.

The apparatus used was the same as that used in Example 3.

An 0.01 M FeCl$_3$ solution was forced through the metal membrane at a pressure of 30 p.s.i. of nitrogen gas. The effluent liquid was clear and colorless while the feed solution was brownish yellow typical when the ferric ions are present. The rejection rate in this case was 63% based on the total iron. This value was derived by standard wet quantitative analysis.

The permeability of the eached metal membrane to 0.01 M FeCl$_3$ solution at $\Delta p=30$ p.s.i. was approximately 8 gal./ft.$^2$ day atm. This filter is, therefore, useful in removing iron from waste, brackish or well and community water contaminated by iron.

EXAMPLE 6

An alloy comprised of 56.5 percent by weight nickel, 25.5 percent by weight aluminum and 19 percent by weight molybdenum was prepared by melting the components, each of which was about 99.9 percent pure, under argon in an alumina crucible. The molten alloy was cast under argon in a copper mold to produce a cylindrical ingot about 2.2 cm. in diameter and 15 cm. in length.

The ingot was placed in an alumina crucible and was directionally solidified at a rate of $6 \times 10^{-4}$ cm. per second (0.8 inch per hour). Metallographic examination of both ends and along the length of the ingot showed it to be composed of molybdenum-rich rods in a nickel aluminum-rich matrix wherein the rod phase was substantially perpendicular to the planes of both ends of the ingot. The ingot was sliced transversely to the rod growth direction by a cut-off machine. Each slice was about 50 mils thick. The distorted surface layers generated during slicing were mechanically polished to a mirror-smooth surface. Metallographic examination of the resulting polished specimen showed a uniform array of molybdenum-rich rods generally perpendicular to the cut surface. The specimen was made the anode in a conventional electrolytic cell having an electrolyte of 3 percent oxalic acid in water. Stainless steel was used as the cathode. A potential of 3 v.-DC was applied for 30 minutes. The etched specimen was then rinsed with water and examined metallographically. The molybdenum-rich rod phase had been substantially selectively removed to a depth of 50 microns leaving an etched metallic material wherein the recesses measured approximately 0.3 to 0.5 micron in diameter as determined by an electron beam microscope.

This etched metallic specimen was then used as a master to prepare a polymer replica of it. Specifically, a 5 mil thick sheet of cellulose acetate was softened in acetone at room temperature and then applied to the etched recess-containin gsurface of the specimen. After drying, the cellulose acetate surface adjacent to the etched surface of the specimen was a negative replica of that surface.

The etched material of the present invention generally has a uniform array of straight through, substantially parallel holes or recesses which are usually substantially cylindrical throughout their lengths and of uniform cross-section, which depends largely on the size of the rods to be etched. The instant etched solid having holes is particularly useful as a filter, and it is especially useful as a membrane or filter for very fine materials. As a filter, the best flow is provided by the thinnest foil since it offers the least resistance or drag for fluid to pass through.

In one embodiment of the present invention, for specific applications, the protruding matrix of the etched specimen is tapered or pointed by conventional methods such as, for example, by withdrawing that portion of the matrix slowly from the electrolyte while it is being electrolytically etched.

In another embodiment of the present invention, the product produced by the present process is used as a master, template or die for the production of inexpensive replications of materials with desirable properties. Such replications can be made in a conventional manner with a number of materials which are capable of conforming to the etched recesses or holes. For example, a film of a polymer may be laid on a surface of the etched body. To obtain a good replica of the recesses or holes, the resulting assembly can be heated to soften the polymer and improved conformation can be obtained by means of a vacuum. The film can then be allowed to solidify, after which it is lifted off the master and is a negative replica of its surface. This replica surface can then serve as a substrate on which another film is deposited to conform thereto. When the deposited film is separated from the substrate, it is substantially identical to the master, i.e. if the master is a fitler, it is a substantially identical filter.

The product of the present invention wherein the protruding matrix portions are tapered are especially useful in producing, by means of replication, filters with tapered pores. Such filters are useful to allow greater fluid flow for a given limiting size. The degree of tapering in the pores in the replica membrane or filter can be controlled by controlling the size of the tapered portions of the matrix by conventional etching techniques as well as the thickness of the replica film.

In still another embodiment of the present invention, composites can be formed for a wide variety of special applications by filling the holes or recesses of the etched material of the present invention with a foreign material, i.e. a material different from that of the etched material. For example, they can be filled with superconductive material or with iron particles to produce oriented, single-domain ferromagnetic sheet.

It will be apparent to those skilled in the art that a number of variations are possible without departing from the scope of the invention.

In the product of the present invention, a substantially uniform array of pores of controlled diameter can be produced. This product is particularly useful as a collimator for radiation particles which cause damage tracks in materials such as polymers, especially polycarbonates. These radiation tracks etch more easily than the rest of the polymer and therefore can be used for a number of applications. The use of the etched porous metal foil of the present invention as a collimator guarantees uniform size pores in the irradiated polymers, in an orderly array where none overlap after etching. This is important in micro filtration applications such as cancer cell filtration.

Additional methods of treating alloys to produce a solid two phase structure wherein one phase is distributed in a fine form in a matrix comprised of the second or other phases and wherein said finely distributed phase is selectively removed by etching and/or articles formed therefrom are disclosed and claimed in the following co-pending applications:

U.S. Pat. application Ser. No. 787,837 filed of even date herewith in the name of Harvey E. Cline, Robert R. Russell, and Warren DeSorbo, and assigned to the assignee hereof is directed to the preparation of thin porous metallic film with substantially parallel and uniform apertures by means of a replication technique. Specifically, the etched article produced in the present application is used as a master from which a negative replica is formed. The negative replica is then used as a substrate on which there is deposited metal which is then recovered from the substrate as a porous film.

U.S. Pat. application Ser. No. 787,751 filed of even date herewith in the name of Daeyong Lee and Robert R. Russell and assigned to the assignee hereof is directed to cast alloys having a two phase lamellar structure. The cast structure is plastically deformed to convert the lamellar structure to a substantially equiaxed structure and one of the equiaxed phases is then selectively removed by etching to produce recesses or apertures.

U.S. Pat. application Ser. No. 787,838 filed of even date herewith in the name of Daeyong Lee and assigned to the assignee hereof is directed to the treatment of an alloy having the characteristic of being comprised of at least two phases in the solid state to produce at least one phase in a fine form distributed in a matrix comprised of the second or other phases. The resulting treated article is etched to remove the finely distributed phase to produce apertures or, if desired, recesses.

What is claimed is:

1. A method for preparing an article with substantially parallel apertures or recesses which comprises providing a cast alloy which in the cast solid state is comprised of at least two phaes, directionally solidifying said cast alloy to produce a body wherein one phase is present as a plurality of substantially parallel rods passing through a matrix comprised of the second or other phases, and etching said rods to form recesses or apertures.

2. A method according to claim 1 wherein said etching is carried out electrolytically.

3. A method according to claim 1 wherein said alloy is of eutectic composition or within about 10% of eutectic composition.

4. A method according to claim 3 wherein said alloys contains at least one element which is a metal.

5. A method according to claim 3 wherein said alloy is non-metallic.

6. A method according to claim 3 wherein said alloy is NiAl-Cr.

7. A method according to claim 3 wherein said alloy is NiAl-Mo.

8. A method according to claim 1 wherein said rate of solidification may range from about $1 \times 10^{-5}$ to 0.1 centimeters per second.

9. A method according to claim 1 wherein said directionally-solidified body is in the form of an ingot, cutting said ingot transversely to produce a slice of ingot and etching said rods from said slice of ingot.

10. A method according to claim 9 wherein said slice of ingot is polished to a foil prior to etching.

11. A method according to claim 9 wherein at least a portion of the matrix adjacent the apertures or recesses is tapered by etching.

12. The product produced by the process of claim 11.

13. The product produced by the method of claim 1.

14. The product of claim 13 wherein said recesses or apertures contain a foreign material.

15. The product of claim 13 in which the apertures or recesses are straight-through and are of substantially uniform transverse cross-sectional size throughout their lengths and range in diameter from about 1000 Angstroms to about 10 microns.

References Cited

UNITED STATES PATENTS

| | | | |
|---|---|---|---|
| 3,097,149 | 7/1963 | Lacroix | 204—146 |
| 3,234,609 | 2/1966 | Madono | 164—127 |
| 3,352,769 | 11/1967 | Rubin | 204—284 |
| 3,376,915 | 4/1968 | Chandley | 164—127 |
| 3,405,220 | 10/1968 | Barrow et al. | 164—127 |
| 3,485,291 | 12/1969 | Piearcey | 164—127 |
| 3,124,452 | 3/1964 | Kraft | 75—135 |

OTHER REFERENCES

Fabrication of An Ultra-Fine Cb-Cu Composite by Drawing by H. E. Cline, et al. Trans. of American Society of Metals vol. 59, No. 1, March 1966.

TA-HSUNG TUNG, Primary Examiner

T. TUFARIELLO, Assistant Examiner

U.S. Cl. X.R.

29—163.5, 191.4, 527.6; 156—7; 164—125